(12) United States Patent
Conway et al.

(10) Patent No.: US 6,484,988 B2
(45) Date of Patent: Nov. 26, 2002

(54) BIAS-ASSISTED SIGN MOUNT

(75) Inventors: Thomas M. Conway, Chicago, IL (US); Scott Padiak, Winnetka, IL (US)

(73) Assignee: Cormark, Inc., Elk Grove Village, IL (US)

( * ) Notice: Subject to any disclaimer, the term of this patent is extended or adjusted under 35 U.S.C. 154(b) by 0 days.

(21) Appl. No.: 10/044,601

(22) Filed: Jan. 11, 2002

(65) Prior Publication Data

US 2002/0092956 A1 Jul. 18, 2002

Related U.S. Application Data

(60) Provisional application No. 60/261,968, filed on Jan. 16, 2001.

(51) Int. Cl.[7] ................................................. A47F 5/00
(52) U.S. Cl. .................. 248/289.11; 40/492; 40/642.02
(58) Field of Search ........................... 248/228.8, 291.1, 248/292.13, 289.11, 282.1, 492.14; 40/492, 642.02

(56) References Cited

U.S. PATENT DOCUMENTS 3,174,365 A  *  3/1965  Lucarelli ............. 248/292.1 X
5,803,420 A  *  9/1998  Conway et al. ......... 248/231.41
5,934,633 A  *  8/1999  Padiak et al. ............. 248/228.8

* cited by examiner

*Primary Examiner*—Ramon O. Ramirez
(74) *Attorney, Agent, or Firm*—Welsh & Katz, Ltd.

(57) ABSTRACT

A biased-assisted sign mounting system for mounting an associated sign to an associated structure includes a mount portion configured for attaching to the structure, an arm mounted to the mount portion and having a pivot portion defining a pivot axis about the mount portion, and a biasing element operably connected to the mount portion and to the arm. The mount and arm each have a biasing element capturing portion at which the biasing element is captured. The biasing element is moveable between a more stressed state and a less stressed state. The arm is pivotal between first and second positions and is stopped at the first and second positions by engagement with the mounting portion. The arm is secured into the first and second positions by the biasing element tending toward the less stressed state and, when the arm is disposed between the first and second positions, the biasing element is urged into the more stressed state.

21 Claims, 3 Drawing Sheets

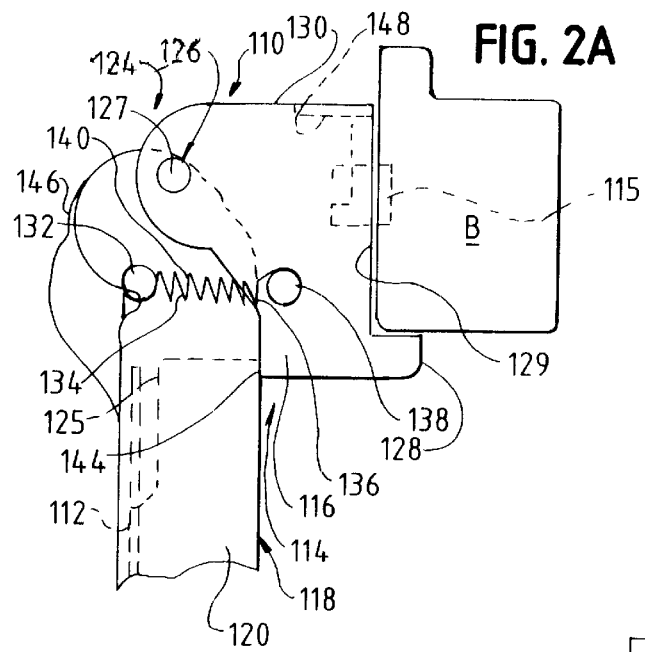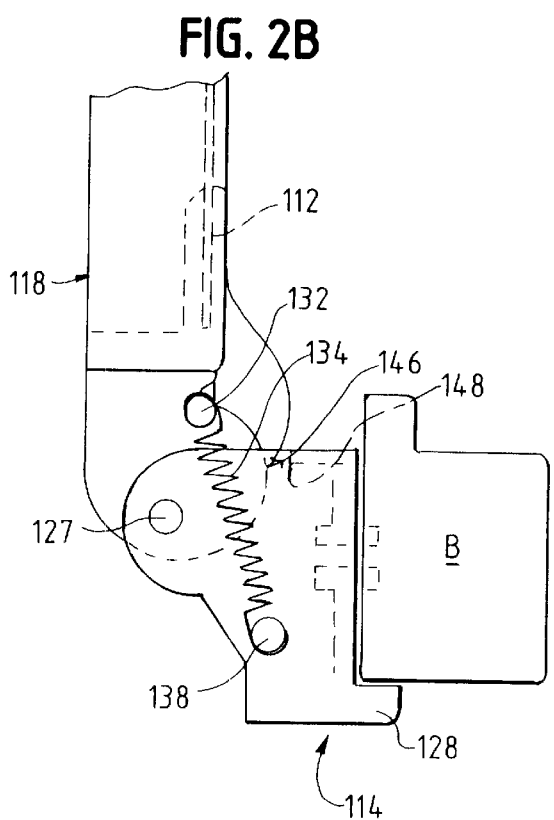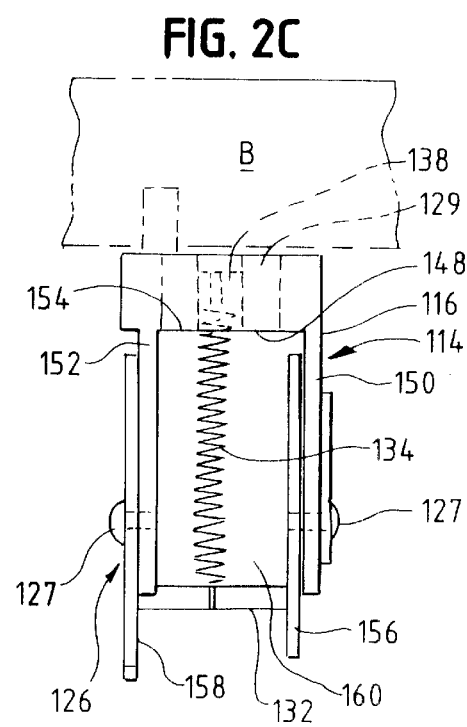

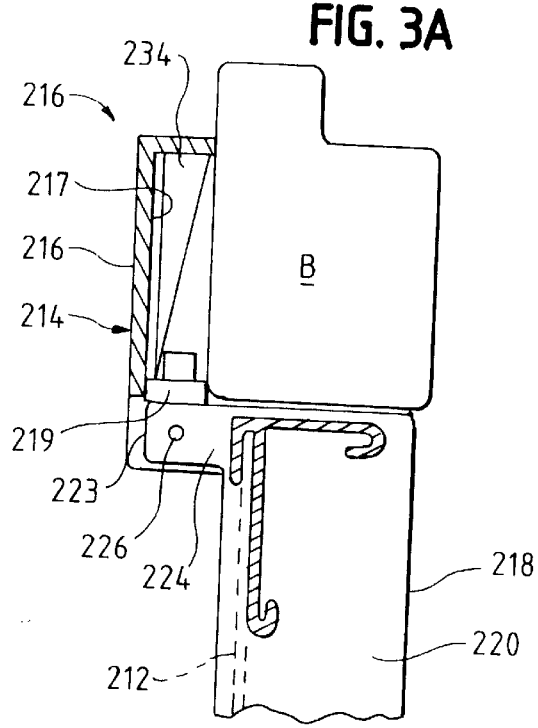
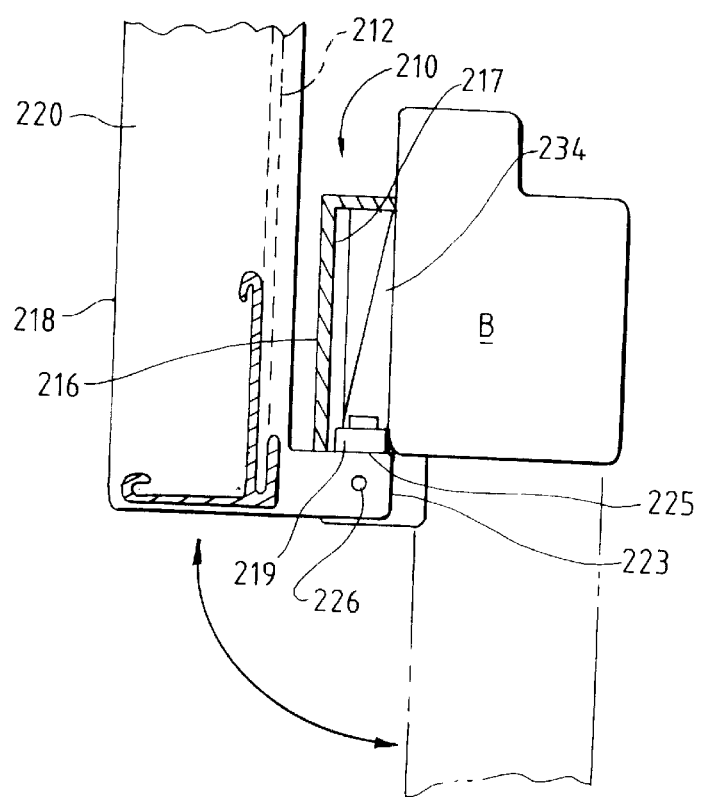

BIAS-ASSISTED SIGN MOUNT

BACKGROUND OF THE INVENTION

The present invention pertains to a bias-assisted sign mounting system. More particularly, the present invention pertains to a pivotal, two-position sign mounting system that uses a bias assist to maintain the sign in an opened or closed position.

Signs, and more particularly, point of purchase sign or display systems can, when properly designed, be tremendously effective marketing tools. These systems have become widely popular in all manners of retail trade.

In one common use, signs are mounted to shelving systems that permit loading of pallets and palletized items onto the stocking shelves. These are commonly referred to as pallet racks. These arrangements permit the storage of large items and large amounts of items on each of the shelves. However, these shelves do not typically lend themselves to the mounting of point-of-purchase displays or signs thereon.

Many known signs are permanently or semi-permanently affixed to the shelves and are hung above or below the shelving systems. While many of these signs work quite well to direct the consumer's attention to the particular products, they do not permit ready access to the shelves to, for example, restock the shelves or retrieve items from the shelves. This, of course, is particularly true of those signs that are permanently or semi-permanently affixed to the shelves.

Known mounting systems include those disclosed in Padiak et al., U.S. Pat. No. 5,934,633, entitled "Pivotal, Two-Position Locking Sign Mounting System" and Conway et al., U.S. Pat. No. 5,803,420, entitled "Universal Sign Mounting Device", both of which are commonly assigned with the present application. These systems function well, however, they require some locking arrangement to maintain the sign in a storage (e.g., open) or display (e.g., closed) position. The aforementioned Padiak et al. and Conway et al. patents are incorporated herein by reference.

Accordingly there exists a need for a point-of-purchase display or sign mounting system that is used to position a sign in a particular, desired orientation and position, and that is effective for point-of-purchase marketing. Desirably such a system permits fully rotating or pivoting the sign out of the way from a display position to a storage position, to restock the shelf over which the sign is located. Such a mounting system requires minimal hardware to mount the sign to an associated shelving system and further requires no additional hardware to move or pivot the sign from the display position to the storage position. Most desirably, such a system uses a biasing element to assist in moving and maintaining the sign in both the closed and opened positions, with a single biasing element.

BRIEF SUMMARY OF THE INVENTION

A biased-assisted sign mounting system is used for mounting an associated sign to an associated structure. The mounting system includes a mount portion configured for attaching to the structure, an arm mounted to the mount portion and having a pivot portion defining a pivot axis about the mount portion, and a biasing element operably connected to the mount portion and to the arm at their respective biasing element securing portions. The mounting system uses the tendency of a springs to return to a least or less stressed state to maintain the sign in a first closed or second open position.

In one embodiment, the system is a tension-biased system in which a tension biasing element is operably connected to the mount portion and to the arm at their respective biasing element securing portions. The arm is secured into the first and second positions by the biasing element tending to a less tensioned state. When the arm is moved between the first and second positions, the biasing element traverses a path crossing the pivot axis that defines a maximum state of tension. In the first and second positions, the biasing element is in a state of tension less than the maximum state of tension.

In a current embodiment, the biasing element is a coil spring. The first position is a closed position and the second position is an open position. The open and closed positions are 180° from one another by rotation of the arm.

The mounting portion can include an upper stop surface configured for engagement with a lip formed on the arm to prevent over-rotation of the arm beyond the open position. The mounting portion can also include a lower stop surface for engagement with the arm to prevent over-rotation of the arm beyond the closed position.

In one embodiment, the mount includes a body have first and second spaced apart outwardly extending flanges. The arm also includes a pair of spaced apart flanges, one each associated with a respective mount flange. In this configuration, the biasing element is disposed between the respective pairs of flanges. The mount includes a pair of spaced apart, collinear pivot pins. One pin is associated with a respective pair of flanges.

An alternate embodiment is a compression-biased mounting system. In such a system the mount portion includes a biasing element capturing portion and the arm includes a camming surface spaced from the pivot axis. The compression biasing element is disposed between the mount portion and the arm at their respective biasing element capturing portions. When the arm is moved between the first and second positions, the biasing element is compressed into a compressed state by the camming portion of the arm which portion, when compressed against the biasing element, defines a maximum compressed state. In the first and second positions, the biasing element is in a state of compression less than the maximum compressed state.

Preferably, the mount defines a cavity in which the biasing element is disposed. The arm can include a cam follower disposed between the camming surface and the biasing element. The first position is a closed position and the second position is an open position. The open and closed positions are 180° from one another by rotation of the arm.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein:

FIG. 2A illustrates an alternate embodiment of a tension-bias assisted sign mount embodying the principles of the present invention, illustrated with a sign in the closed position;

FIG. 2B illustrates tension-bias assisted sign mount of FIG. 2A with the sign in the open position;

FIG. 2C is a top view of the tension-bias assisted sign mount of FIGS. 2A and 2B;

FIG. 3A illustrates a compression-bias assisted sign mount embodying the principles of the present invention, illustrated with a sign in the closed position; and FIG. 3B illustrates the compression-bias assisted sign mount of FIG. 3A with the sign in the open position.

DETAILED DESCRIPTION OF THE INVENTION

Figure 1A:
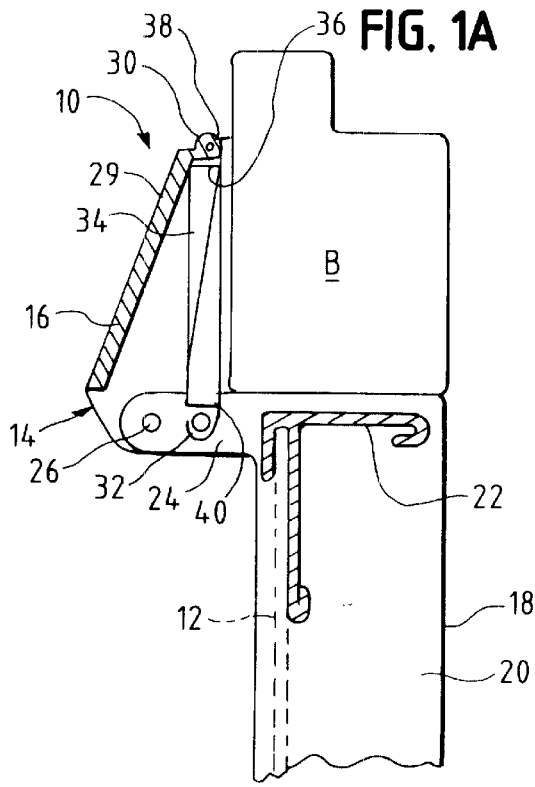
FIG. 1A illustrates a tension-bias assisted sign mount embodying the principles of the present invention, illustrated with a sign in the closed position.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated. It should be further understood that the title of this section of this specification, namely, "Detailed Description Of The Invention", relates to a requirement of the United States Patent Office, and does not imply, nor should be inferred to limit the subject matter disclosed herein.

Figure 1B:
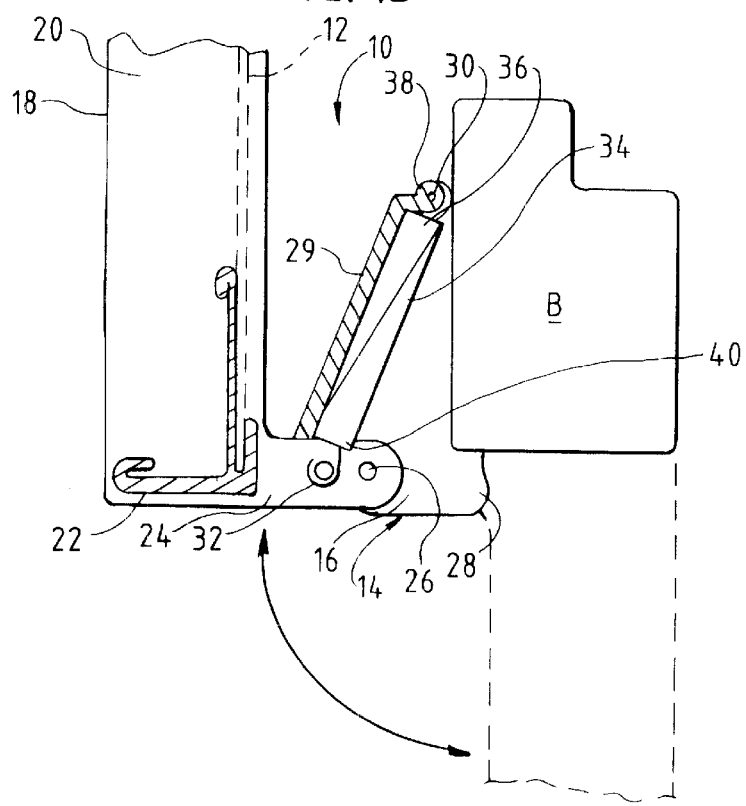
FIG. 1B illustrates the tension-bias assisted sign mount of FIG. 1A with the sign in the open position.

Referring now to the figures and in particular to FIGS. 1A and B, there is shown one embodiment of a bias-assisted sign mount system 10 embodying the principles of the present invention. The sign mount system 10 illustrated is a tension-bias arrangement, and is shown mounted to an exemplary pallet rack beam B such as that discussed and illustrated in the above-noted U.S. Pat. No. 5,934,633 to Padiak et al. The sign 12 is pivotable between a closed or viewing position (as shown in FIG. 1A) and an open or storage position (as shown in FIG. 1B) to, for example, restock a shelf below which the sign 12 the mounted.

A mount 14 includes a body portion 16 that is mounted to the pallet rack beam B. The body portion 16 can be mounted to the beam B in any commonly known manner, such as using mechanical fasteners (not shown). A sign support or arm 18 is mounted to the mount body 16. The arm 18 includes an elongated portion 20 from which the sign 12 is supported. Transverse members 22 can extend between a pair of arms 18 (one shown) to support lateral (upper and lower) edges of the sign 12. The arm 18 includes a pivot section 24 that extends transversely from an upper region of the elongated portion 20, as seen in FIG. 1A, at about that portion of the arm 18 adjacent the beam B when the sign 12 is in the closed position. The arm 18 is mounted, at the pivot section 24, to the mount 14 at a pivot 26. To this end, the arm 18 pivots or rotates about the mount 14 at the pivot 26.

The mount 14 includes a base portion 28 that engages a lower end of the pallet rack beam B and a face portion 29 that extends upwardly from the base 28 along a front surface of the beam B. The mount 14 terminates at an uppermost portion 30 that is spaced from the base portion 28.

The arm 18 includes a capturing portion shown as a securing pin 32 that is spaced intermediate the pivot 26 and the elongated arm portion 20. A tension biasing element 34, such as a coil spring, is mounted at one end 36 to the mount 14 at about the uppermost portion 30, at a capturing portion such as the illustrated spring mount 38. An opposing end 40 of the spring 34 is mounted to the pin 32 located on the pivot section 24. The spring 34 is maintained in tension in this arrangement.

Referring now to FIGS. 1A and B, the sign 12 is shown in the closed and opened positions, respectively. In both positions, although the spring 34 is in tension, it is in a least stressed (in this arrangement, a least tensioned state) relative to positions intermediate the closed and opened positions. That is, as the sign 12 is rotated from the closed position to the open position, the spring 34 is pulled or further tensioned through the rotation. As such, the least tensioned states are those shown in FIGS. 1A and 1B. Because these are the least tensioned states, the sign 12 will be maintained in either the closed or opened position as rotated.

As will be recognized from a study of the drawings, as the sign 12 is rotated from the closed position to the opened position, the pin 32 moves in a path that rotates clockwise about the pivot 26, increasing the straight-line distance between the pin 32 and the spring mount 38. To this end, the spring 34 is stretched or further tensioned during rotation as the sign 12 is pivoted about the pivot 26. Because the sign 12 will tend to the least tensioned states of the spring 34, it will tend to the opened and closed positions.

An alternate embodiment of the bias-assisted sign mount system 110 is illustrated in FIGS. 2A–2C. This embodiment is similar to that shown in FIGS. 1A–1B in that it is a tension-bias arrangement. A mount 114 includes a body portion 116 that is mounted to, for example, a pallet rack beam B. A mechanical fastener, such as a bolt 115 can be used to mount the body portion 116 to the beam B. A sign support or arm 118 is pivotally mounted to the body 116. The arm 118 includes an elongated portion 120 from which the sign 112 is supported. As with the earlier embodiment 10, transverse members (not shown) can extend between a pair of arms 118 to support upper and lower lateral edges of the sign 112.

The arm 118 includes a pivot section 124 at an upper region 125 of the elongated portion 120, at about that portion of the arm 118 adjacent the beam B when the sign 112 is in the closed position (FIG. 2A). The arm 118 is mounted, at the pivot section 124, to the mount 114 by a pivot 126. In the illustrated embodiment, two pivot pins 127 extend between the pivot section 126 and the mount 114 to pivotally mount the arm 118 to the body 116. As such, the arm 118 pivots relative to the body 116 about the pins 127.

The mount 114 includes a base portion 128 that engages a lower end of the pallet rack beam B and a face portion 129 that extends upwardly from the base portion 128 and rests along a front surface of the beam B. The mount 114 terminates at an uppermost portion 130 that is spaced from the base portion 128. As will be discussed below, the uppermost portion 130 provides a stop for rotation of the arm 118 when in the open position (FIG. 2B).

The arm 118 includes a spring securing portion 132 that is spaced intermediate the pivot 126 and the elongated arm portion 120. A biasing element 134, such as the exemplary coil spring, is mounted to at one end 136 to the body 116 at a spring mount 138 and at an opposing end 140 to the arm 118 at the securing portion 132.

As seen in FIGS. 2A and 2B, the sign 112 is shown in the closed and open positions, respectively. In both positions, although the spring 134 is in tension, it is in a least tensioned state, relative to positions between the open and closed positions. That is, as the sign 112 (arm 118) is rotated from the closed position to the open position, the spring 134 is pulled or further tensioned through the rotation. As such, the least tensioned states are those shown in FIGS. 2A and 2B. Because these are the least tensioned states, the sign 112 will remain in these positions by the spring 134 tension.

Those skilled in the art will appreciate that the most tensioned state is that point at which the spring 134 is at a maximum stretch. In the present mount systems 10, 110, this point is reached when those portions of the mount and arm onto which the spring is secured are aligned with the pivot. For example, in the embodiment of FIGS. 3A–3C, this point is reached when the spring securing portion 132, pivot pins 127 and spring mount 138 are aligned. When, as seen in FIGS. 2A–2B, the arm is at rest beyond this aligned position, the spring is at a less than maximum tensioned (or least tensioned) state.

As seen in FIG. 2A, when in the closed position, the sign 112 is prevented from over-rotating by contact of the arm 118 with a mount lower stop surface 144. This serves as a stop for the arm 118 in the closed position. In the open position, the arm 118 is prevented from over-rotating by a lip 146 formed on the arm 118 that engages a mount upper stop surface 148. This serves as a stop for the arm 118 in the open position.

Referring now to FIG. 2C, there is shown a top view of the sign mount system 110 of FIGS. 2A and 2B. As can be seen from this figure, the mount 114 is formed as a pair of flanges 150, 152 that extend outwardly from the body 116. An upper wall 154 extends between the flanges 150, 152 at the uppermost portion 130 of the body 116. The upper wall 154 forms the upper stop surface 148. The arm pivot section 124 also includes a pair of flanges 156, 158, one each associated with the mount flanges 150, 152, respectively. The pins 127 extend through respective, abutting mount and arm flanges 150, 156 and 152, 158. In this manner, the central area, indicated at 160, between the respective sets of flanges 150, 156 and 152, 158, is open or unobstructed.

The spring 134 is mounted to the arm 118 and to the mount 114 in this unobstructed central region 160. Thus, as the arm 118 is rotated between the open and closed position, its movement (to and between the positions shown in FIGS. 2A and 2B), is also unobstructed by, for example, the pivot pins 127.

FIGS. 3A and 3B illustrate a mount system 210 that uses a compression-bias arrangement. Again, FIG. 3A illustrates the sign 212 in the closed position and FIG. 3B illustrates the sign 212 in the opened position. A mount 214 is positioned on the pallet rack beam B and secured thereto by methods, such as mechanical fasteners, that will be recognized by those skilled in the art. The mount 214 includes a body 116 that defines a capturing portion formed as a chamber 217.

The sign arm 218 includes an elongated section 220 from which the sign 212 is supported. The arm 218 further includes a pivot section 224 defining a pivot point 226. The pivot section 224 extends transverse from an upper portion of the arm 218 adjacent the beam B when the sign 212 is in the closed position as seen in FIG. 3A.

A compression-biasing element, such as a coil spring 234 is positioned within the chamber 217 in the body 216. A cam follower 219 is positioned on, and can be mounted to a lower end 221 of the spring 234, and is in contact with the pivot section 224. The pivot section 224 defines a capturing portion formed as a camming surface 225 that is in contact with or engaged by the cam follower 219. To this end, as the sign 212 is pivoted from the closed position through to the opened position, the pivot section 224 cams against the cam follower 219 urging the cam follower 219 upward, compressing the spring 234, until the sign 212 is fully pivoted into the opened position as shown in FIG. 3B.

Again, the spring 234 is in a least stressed (in this arrangement, a least compressed) state when the sign 212 is in the fully closed or fully opened positions as shown in FIGS. 3A and 3B. At any position through rotation between these positions, a cam surface 223 of the pivot section 224 engages (e.g., rides along) and urges the cam follower 219 to compress the spring 234. Once the sign 212 is pivoted beyond the point at which the cam surface 223 engages the cam follower 219, the spring 234 returns to a less compressed state.

Springs tend to a least or less stressed state. Certain types of springs can be compressed from a less stressed state to a more stressed state. These springs will tend to expand back to their less stressed state. Other types of springs can be pulled or tensioned from a less stressed state to a more stressed state. These springs will tend to contract back to their less stressed state. The present bias assisted sign mount systems 10, 110, 210 use these spring principles by passing a spring through a greater state of stress during movement from a first position to a second position. In both the first and second positions, the springs are in a less stressed state than that to which they are subjected during movement between the positions. In this manner, the tendency of the spring to return to its less stressed state is used to maintain the mount systems 10, 110, 210 in the respective first and second positions.

To this end, those skilled in the art will recognize that biasing element other than springs can be used to carry out the present invention. For example, it is anticipated that elastic bands can be used for the tension-biased mounts 10, 110. Likewise, leaf-type springs can also be used for the bias assisted mounts 10, 110, 210. Other biasing elements will be recognized by those skilled in the art and are within the scope and spirit of the present invention.

As will be recognized by those skilled in the art from a study of the figures, the bias assisted sign mount 10, 110, 210 urges the sign 12, 112, 212 into either a fully closed or fully opened position and helps to maintain the sign 12, 112, 212 in that position. Moving the sign 12, 112, 212 between the closed and opened positions is readily carried out, merely by grasping and rotating the sign 12, 112, 212, and the action of the bias (spring 34, 134, 234) helps to maintain the sign 12, 112, 212 in the desired position for viewing by the consumer or storage to, for example, restock a shelf below which the sign 12, 112, 212 is secured.

As will be appreciated by those skilled in the art, although the present sign mounts 10, 110, 210 have been described referring to closed and open positions, upper and lower elements, and the like, it is to be understood that these relative terms have been used merely for explanation and ease of understanding the present invention. As such, the invention may be used in a variety of orientations, which orientations are within the scope and spirit of the present invention, and which orientations and descriptions thereof should not be inferred to limit the claims that follow.

In the present disclosure, the words "a" or "an" are to be taken to include both the singular and the plural. Conversely, any reference to plural items shall, where appropriate, include the singular.

The disclosure of each patent cited herein, whether or not done so specifically, is incorporated herein by reference.

From the foregoing it will be observed that numerous modifications and variations can be effectuated without departing from the true spirit and scope of the novel concepts of the present invention. It is to be understood that no limitation with respect to the specific embodiments illustrated is intended or should be inferred.

What is claimed is:

1. A biased-assisted sign mounting system for mounting an associated sign to an associated structure, the mounting system comprising:

a mount portion configured for attaching to the structure, the mount portion having a biasing element securing portion;

an arm mounted to the mount portion and having a pivot portion defining a pivot axis about the mount portion, the arm having a biasing element securing portion; and a tension biasing element operably connected to the mount portion and to the arm at their respective biasing element securing portions, wherein the arm is pivotal between first and second positions and is stopped at the first and second positions by engagement with the mount portion and is secured into the first and second positions by the biasing element, and wherein when the arm is moved between the first and second positions, the biasing element traverses a path crossing the pivot axis that defines a maximum state of tension, and wherein in the first and second positions, the biasing element is in a state of tension less than the maximum state of tension.

2. The bias-assisted sign mounting system in accordance with claim 1 wherein the biasing element is a coil spring.

3. The bias-assisted sign mounting system in accordance with claim 1 wherein the first position is a closed position and the second position is an open position, and wherein the open and closed positions are 180° from one another by rotation of the arm.

4. The bias-assisted sign mounting system in accordance with claim 3 wherein the mount portion includes an upper stop surface configured for engagement with a lip formed on the arm to prevent over-rotation of the arm beyond the open position.

5. The bias-assisted sign mounting system in accordance with claim 3 wherein the mount portion includes a lower stop surface for engagement with the arm to prevent over-rotation of the arm beyond the closed position.

6. The bias-assisted sign mounting system in accordance with claim 1 wherein the mount portion includes a body have first and second spaced apart outwardly extending flanges and wherein the arm includes a pair of spaced apart flanges, one each associated with a respective mount portion flange, and wherein the biasing element is disposed between the respective pairs of flanges.

7. The bias-assisted sign mounting system in accordance with claim 6 wherein the respective pairs of mount and arm flanges define a space therebetween and wherein the biasing element is disposed in the space between the respective flange pairs.

8. The bias-assisted sign mounting system in accordance with claim 7 including a pair of spaced apart, collinear pivot pins, one each associated with a respective pair of flanges.

9. The bias-assisted sign mounting system in accordance with claim 1 wherein the mount portion includes a base portion and a face portion, and wherein the base portion and the face portion are disposed about 90° from one another.

10. A biased-assisted sign mounting system for mounting an associated sign to an associated structure, the mounting system comprising:

a mount portion configured for attaching to the structure, the mount portion having a biasing element securing portion;

an arm mounted to the mount portion and having a pivot portion defining a pivot axis about the mount portion, the arm having a biasing element securing portion and a camming portion spaced from the pivot axis; and a compression biasing element operably disposed between the mount portion and the arm at their respective biasing element securing portions, wherein the arm is pivotal between first and second positions, is stopped at the first and second positions by engagement with the mount portion and is secured into the first and second positions by the biasing element, and wherein when the arm is moved between the first and second positions, the biasing element is compressed into a compressed state by the camming portion of the arm which portion, when compressed against the biasing element defines a maximum compressed state, and wherein in the first and second positions, the biasing element is in a state of compression less than the maximum compressed state.

11. The bias-assisted sign mounting system in accordance with claim 10 wherein the mount portion defines a cavity therein and wherein the biasing element is disposed in the cavity.

12. The bias-assisted sign mounting system in accordance with claim 10 including a cam follower disposed between the camming surface and the biasing element.

13. The bias-assisted sign mounting system in accordance with claim 10 wherein the mount portion includes a base portion and a face portion, and wherein the base portion and the face portion are disposed about 90° from one another.

14. The bias-assisted sign mounting system in accordance with claim 10 wherein the first position is a closed position and the second position is an open position, and wherein the open and closed positions are 180° from one another by rotation of the arm.

15. A biased-assisted sign mounting system for mounting an associated sign to an associated structure, the mounting system comprising:

a mount portion configured for attaching to the structure, the mount portion having a biasing element securing portion;

an arm mounted to the mount portion and having a pivot portion defining a pivot axis about the mount portion, the arm having a biasing element securing portion; and biasing means operably connected to the mount portion and to the arm, wherein the arm is pivotal between first and second positions and is stopped at the first and second positions by engagement with the mount portion and is secured into the first and second positions by the biasing means, and wherein when the arm is moved between the first and second positions, the biasing means exhibits a maximum bias, and wherein in the first and second positions, the biasing means exhibits a less than maximum bias.

16. The bias-assisted sign mounting system in accordance with claim 15 wherein the biasing means is a tension biasing element.

17. A biased-assisted sign mounting system for mounting an associated sign to an associated structure, the mounting system comprising:

a mount portion configured for attaching to the structure, the mount portion having a biasing element capturing portion;

an arm mounted to the mount portion and having a pivot portion defining a pivot axis about the mount portion, the arm having a biasing element capturing portion; and a biasing element operably connected to the mount portion and to the arm at their respective biasing element capturing portions, the biasing element being moveable between a more stressed and a less stressed state, wherein the arm is pivotal between first and second positions and is stopped at the first and second positions by engagement with the mount portion and is secured into the first and second positions by the biasing element tending toward the less stressed state, and wherein when the arm is disposed between the first and second positions, the biasing element is urged into the more stressed state.

18. The bias-assisted sign mounting system in accordance with claim 17 wherein the biasing element is a spring.

19. The bias-assisted sign mounting system in accordance with claim 18 wherein the spring is a coil spring.

20. The bias-assisted sign mounting system in accordance with claim 17 wherein the biasing element is a tension biasing element.

21. The bias-assisted sign mounting system in accordance with claim 17 wherein the biasing element is a compression biasing element.

* * * * *